United States Patent [19]

Sun et al.

[11] Patent Number: 5,261,022
[45] Date of Patent: Nov. 9, 1993

[54] OPTICAL WAVEGUIDE OF SILICA GLASS FILM ON CERAMIC SUBSTRATE

[75] Inventors: Cheng-ko J. Sun, Worthington; Shin Sumida, Columbus; Tadashi Miyashita, Upper Arlington, all of Ohio

[73] Assignee: Photonic Integration Research, Inc., Columbus, Ohio

[21] Appl. No.: 779,959

[22] Filed: Oct. 21, 1991

[51] Int. Cl.$^5$ .............................................. G02B 6/00
[52] U.S. Cl. ...................................... 385/130; 385/142
[58] Field of Search ................... 385/129, 130, 14, 142

[56] References Cited

U.S. PATENT DOCUMENTS

| | | | |
|---|---|---|---|
| 3,841,882 | 10/1974 | Wolf | 385/142 |
| 3,854,963 | 12/1974 | Rittler | 65/33 |
| 3,858,964 | 1/1975 | Piesslinger et al. | 385/141 |
| 3,873,209 | 3/1975 | Schinke et al. | 385/130 X |
| 3,880,630 | 4/1975 | Izawa | 385/129 X |
| 3,977,886 | 8/1976 | Muller | 501/4 |
| 4,125,388 | 11/1978 | Powers | 65/3.12 |
| 4,157,906 | 6/1979 | Bailey | 65/3.12 |
| 4,165,222 | 8/1979 | de Panafieu et al. | 65/3.15 |
| 4,165,223 | 8/1979 | Powers | 65/3.12 |
| 4,190,315 | 2/1980 | Brettle et al. | 385/129 |
| 4,851,023 | 7/1989 | Gonzales-Oliver | 65/3.14 |
| 4,867,371 | 9/1989 | Davis et al. | 228/160 |
| 5,052,769 | 10/1991 | Aoki et al. | 385/130 |
| 5,059,475 | 10/1991 | Sun et al. | 428/195 |
| 5,133,036 | 7/1992 | Törnqvist | 385/130 |

OTHER PUBLICATIONS

Derwent Publications, "Integrated optical device—includes single-mode optical waveguide with stress applying film disposed on desired portion of Cladding Layer," English–language abstracts of patents or patent applications by M. Kawachi et al. (Jan. 4, 1989).

Derwent Publications, "Single mode silica optical waveguide with core embedded in cladding—has provision for adjusting stress on core to control birefringence," English-language abstracts of patents or patent applications by M. Kawachi et al. (Feb. 3, 1988).

Derwent Publications, "Hybrid optical IC includes optical waveguide, optical fibre guide and optical device guide all formed from same high-silica glass film," English-language abstracts of patents or patent applications by M. Kawachi et al. (Feb. 19, 1986).

*Primary Examiner*—Frank Gonzalez
*Attorney, Agent, or Firm*—Porter, Wright, Morris & Arthur

[57] ABSTRACT

An optical waveguide is disclosed which comprises a substrate of $Al_2O_3$ and a silica glass film of $SiO_2$ applied thereon. The glass film has between 35–90 mol % $SiO_2$. The device may be used in conjunction with electronics on the same substrate to form opto-electronic interconnections. The invention may also be used to apply a thin film glass glaze to a ceramic substrate.

5 Claims, 2 Drawing Sheets

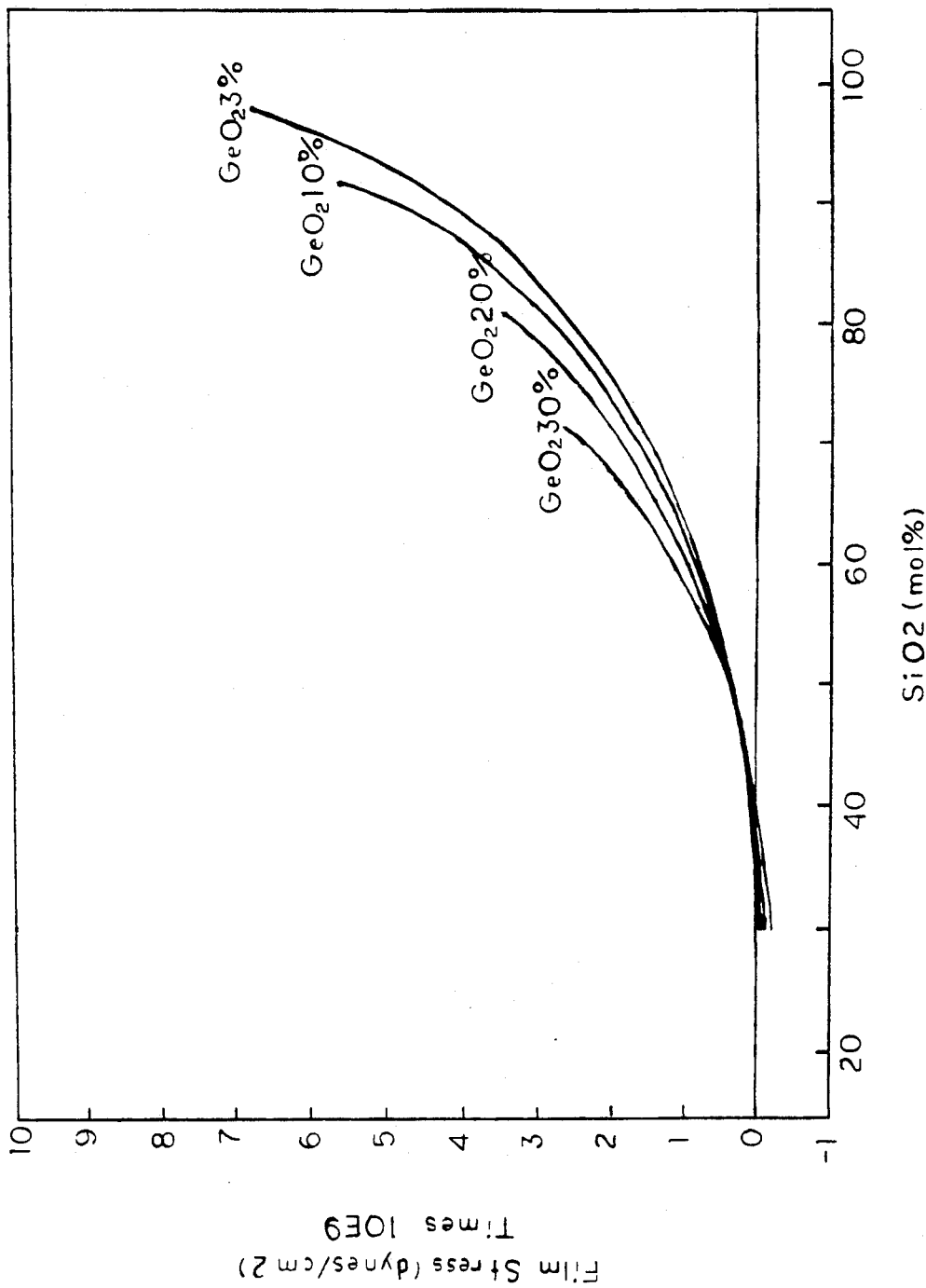

OPTICAL WAVEGUIDE OF SILICA GLASS FILM ON CERAMIC SUBSTRATE

BACKGROUND AND SUMMARY OF THE INVENTION

This invention relates generally to optical waveguides on ceramic substrates, and more particularly to forming a silica glass film on Al2O3 ceramic substrates to be used as an optical waveguide.

As part of the background information for this invention, applicants incorporate by reference herein their previous U.S. patent application filed on Jun. 29, 1990 entitled "Apparatus and Method of Forming Optical Waveguides on Metalized Substrates" which has been granted U.S. Pat. No. 5,059,475. Flame hydrolysis deposition ("FHD"), a process which involves the deposit of powdered glass on a substrate and its subsequent fusion for consolidation into a solid glass at high temperatures, has been used to deposit waveguides for optical signal transmission on silicon and silica substrates. Other deposition methods such as chemical vapor deposition ("CVD") and sputtering have been widely used to form optical waveguides on substrates of silicon and silica. Previous technologies involve silica waveguides made on silicon or silica substrates. But this is limiting to the integration of optics and electronics since electronic integrated circuits are usually bonded onto ceramic substrates. Also, since the melting temperature of silicon is 1410° C. and the softening temperature of silica is around 1300°–1500° C., the waveguide fabrication temperature is limited below these temperatures. A ceramic substrate permits much higher process temperatures, up to 1600°–1700° C., for the fabrication of waveguides thereon.

The present invention offers several advantages over previous technology. Silica integrated optical circuits can now be applied to Al2O3 substrates. Since Al2O3 is a popular electronic substrate, forming optical waveguides on this type of substrate enables integration between optics and electronics. Furthermore, ceramics can withstand higher process temperatures, and normally, better quality silica glass is made at higher temperature. The present invention enables glass with a high thermal expansion coefficient to be deposited onto a substrate made of ceramics. The resulting glass film stress is low to allow long-term stability against film peeling or cracking which often happens on conventional high silica FHD glass.

Another advantage of the invention is that it can be applied to glaze ceramic plates or parts. The present invention is useful as an optical interconnection that can solve bottlenecks of electrical connections in high speed electronics. The present invention involves the formation of optical waveguides on Al2O3 substrates. The Al2O3 substrates may also have electronic or optoelectronic IC chips, to perform as optical interconnects. Therefore, the present invention is useful in making optoelectronic devices for communication and computer applications.

The present invention is a unique formation of glass on Al2O3 substrates. The glass film can be used as an optical waveguide. The glass film may be deposited directly onto the ceramic substrate or onto a coating on the substrate. The glass composition in the present invention is 35–90 mol % SiO2. With this particular glass composition, the thermal expansion mismatch between the glass film and substrate will be low enough to avoid peeling or cracking of the glass film. The FHD process may be used to form the silica glass film on the substrates. The thermal expansion coefficient of the glass film is generally between $15 \times 10^{-7}$ dyne/cm² at 90 mol % SiO2 and $70 \times 10^{-7}$ dyne/cm² at 35 mol % SiO2. Refractive index raising dopants such as GeO2 and TiO2 are used to make layers with different refractive indices. The glass film can also be used to glaze ceramic parts. Both thin film and thick film application Al2O3 substrates can be deposited with these glass films to form waveguides and integrated optical circuits for optoelectronic integration.

The foregoing and other objects and advantages of the invention will become more apparent when considered in view of the accompanying drawings and the following description:

BRIEF DESCRIPTION OF THE DRAWINGS

FIG. 3 is a graph of film stress in FHD glass per SiO2 mol percentage.

DESCRIPTION OF THE PREFERRED EMBODIMENT(s)

Figure 1:
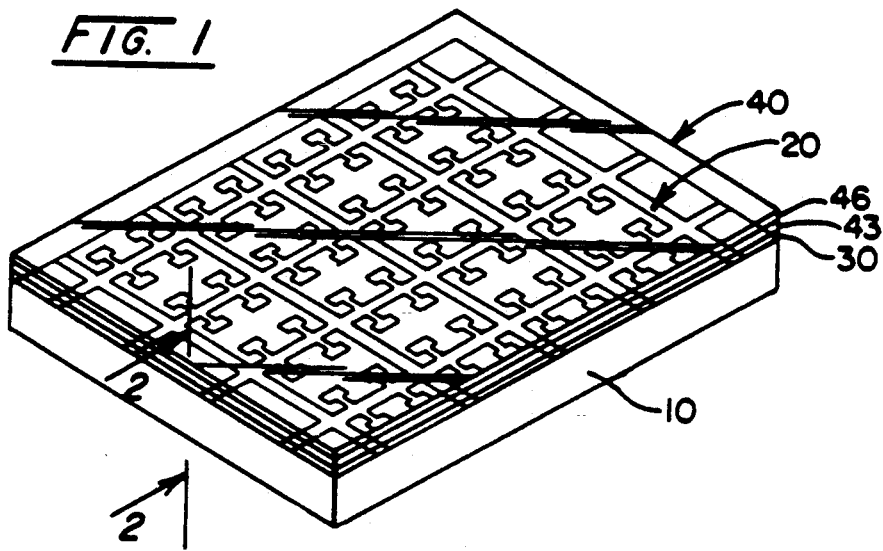
FIG. 1 is a perspective view of a planar waveguide of the present invention applied to a ceramic substrate.
Figure 2:
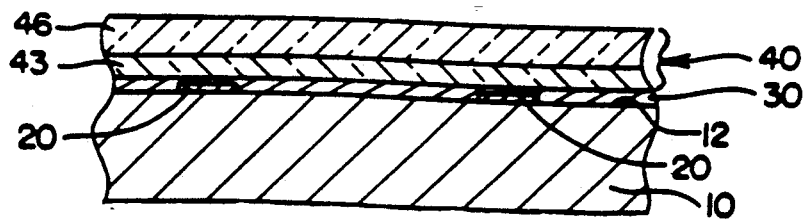
FIG. 2 is an enlarged view of section 2—2 of FIG. 1.

Referring to the drawings, there is illustrated in FIGS. 1 and 2 a ceramic substrate 10 having a planar waveguide formed thereon by glass layers 40 typically comprised of a cladding layer 43 and core layer 46. Al2O3 ceramic substrates may have either a thin film coating 30 thereon or a thick film coating (not shown) thereon and are widely used in micro-electronics device fabrication. Electronic IC chips 20 are normally bonded to these Al2O3 substrates to form either single-chip or multi-chip electronic modules. By the present invention, two or more layers of doped silica glass with different refractive indices can be deposited onto a ceramic substrate with or without a coating thereon to form planar optical waveguides. This enables the integration of optical waveguides/integrated optical circuits with electronic IC chips on the same substrate to form integrated opto-electronic modules. Or, the present invention can be used for strictly optical purposes unrelated to electronics. In addition to forming optical waveguides, this invention can also be utilized to deposit a film of silica glass on ceramic parts to glaze the surface.

Doped silica glass powders with a high thermal expansion coefficient are deposited onto the Al2O3 substrate by flame hydrolysis deposition (FHD) or other deposition methods such as sputtering and chemical vapor deposition (CVD). The deposited substrates are then heated in a furnace to the glass sintering temperature to let the glass powders fuse together to form a solid glass layer. This is known as the consolidation step. The thermal expansion coefficient of the glass is preferably raised by dopants such as B2O3, P2O5, and GeO2 to reduce the film stress caused by the thermal expansion mismatch between silica glass and Al2O3 ceramics. When the SiO2 content in the glass is 90 mol %, the thermal expansion coefficient of the film will be approximately $15 \times 10^{-7}$ dynes/cm² and the thermal stress in the glass film will be compressive and approximately $5.0 \times 10^9$ dynes/cm², which is well below the glass fracture strength of $10^{10}$–$10^{11}$ dynes/cm². (See FIG. 3). If the SiO2 content is less than 35 mol %, the thermal expansion coefficient of the glass will be greater than that of the substrate. This will cause tensile stress in the film and cracking will form in the film. Therefore, glass film with 35-90 mol % SiO2 can adhere to the ceramic substrate without peeling or cracking. In addition to the dopants for raising the thermal expansion coefficient, GeO2 or TiO2 are normally used to raise the refractive index of the core layer. The following experimental results are presented to further explain the invention but should not be construed in any way to limit the scope of the invention to the quantities or materials used:

EXAMPLE 1

The FHD process was used to deposit two layers of glass onto a thick film application Al2O3 (96% purity) substrate and a thin film application Al2O3 (99% plus purity) substrate. The first layer (bottom layer) was approximately 60 microns thick and the second layer (top layer) was between 20 and 30 microns thick after the consolidation. The first layer with a lower refractive index served as the cladding layer and the second layer was the waveguide core layer with 1% higher refractive index.

The cladding layer was 85% mol percentage silica (SiO2) doped with 13% boron oxide (B2O3), 1% phosphorous oxide (P2O3), and 1% gemanium dioxide (GeO2), whose thermal expansion coefficient is approximately $2.0 \times 10^{-6}$. The core layer was 80% silica (SIO 2) doped with 11% gemanium dioxide (GEO 2) in addition to 8.5% B2O3 and 0.5% P2O5. The thermal expansion coefficient of the core layer was approximately $2.5 \times 10^{-6}$. The waveguides showed good light guiding characteristics and the waveguide glass adhered well to the ceramic substrates. The stress in the glass film was estimated to be $3.0-3.5 \times 10^9$ dyne/cm$^2$, which is well below the glass yield strength of $10^{10}-10^{11}$ dyne/cm$^2$.

While it will be apparent that the preferred embodiments of the invention disclosed herein provide the advantages and features above stated, it will be appreciated that the invention is susceptible to modification, variation and change without departing from the proper scope or fair meaning of the claims that are set out below.

What is claimed is:
1. An optical waveguide device, comprising:
   a substrate comprised of Al2O3;
   a cladding layer applied to said substrate, said cladding layer comprised of from about 35 to about 90 mol % SiO2;
   a core layer comprised of from about 35 to about 90 mol % SiO2 applied onto said cladding layer, wherein said cladding layer and said core layer have a thermal expansion coefficient from about $1.5 \times 10^{-6}/°$ C. to about $7.0 \times 10^{-6}/°$ C.
2. The device of claim 1, wherein said cladding layer and said core layer are doped.
3. The device of claim 1, further comprising an electrical device in physical connection with said optical waveguide on said Al2O3 substrate.
4. An optical-electrical device, comprising:
   a substrate consisting essentially of Al2O3, including electrically operative integrated circuits connected on a first planar surface thereof;
   an optically conductive waveguide formed from a glass cladding layer of from about 35 to about 90 mol % SiO2 applied onto said first planar surface and a glass core layer of from about 35 to about 90 mol % SiO2 applied onto said cladding layer, wherein said cladding layer and said core layer have a thermal expansion coefficient from about $1.5 \times 10^{-6}/°$ C. to about $7.0 \times 10^{-6}/°$ C.; and
   the electrically operative integrated circuits are operationally interconnected to the optionally conductive waveguides.
5. An optical waveguide device, comprising:
   a substrate comprised of Al2O3;
   a cladding layer applied to said substrate, said cladding layer comprised of from about 35 to about 90 mol % SiO2;
   a core layer comprised of from about 35 to about 90 mol % SiO2 applied onto said cladding layer; and
   a member of the group consisting of B2O3, P2O5, and GeO2 is added to said core layer and said cladding layer to raise a thermal expansion coefficient of silica glass waveguide layers thereby reducing the thermal expansion mismatch between said waveguide layers and said substrate.

* * * * *